(12) United States Patent
Chang (10) Patent No.: US 7,794,162 B2
(45) Date of Patent: Sep. 14, 2010

(54) MECHANICAL SHUTTER AND CAMERA MODULE HAVING THE SAME

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 174 days.

(21) Appl. No.: 12/174,367

(22) Filed: Jul. 16, 2008

(65) Prior Publication Data

US 2009/0190918 A1 Jul. 30, 2009

(30) Foreign Application Priority Data

Jan. 24, 2008 (CN) .................... 2008 1 0300206

(51) Int. Cl.
  *G03B 9/02* (2006.01)
  *G03B 9/10* (2006.01)
(52) U.S. Cl. .................... 396/508; 396/493
(58) Field of Classification Search .............. 396/470, 396/493, 508
  See application file for complete search history.

(56) References Cited

U.S. PATENT DOCUMENTS

| 6,565,270 | B2 * | 5/2003 | Naganuma | 396/454 |
| 6,767,145 | B2 | 7/2004 | Eguro | |
| 2005/0169627 | A1 * | 8/2005 | Kawauchi | 396/451 |
| 2007/0172231 | A1 * | 7/2007 | Durfee | 396/463 |

* cited by examiner

*Primary Examiner*—Rodney E Fuller
(74) *Attorney, Agent, or Firm*—Andrew C. Cheng (57) ABSTRACT

A mechanical shutter includes a base, four shutter blades, four permanent magnets, and four electromagnets. The base has an aperture for permitting light into a camera module. The shutter blade includes a light shielding portion capable of moving across the aperture by rotating about a shaft formed on the base, a securing portion secured on the base, and an elastic portion connecting the light shielding portion and the securing portion. The permanent magnet is secured on a light shielding portion and sleeves around a shaft. The electromagnets are capable of providing magnetic force to rotate the permanent magnets.

19 Claims, 8 Drawing Sheets

MECHANICAL SHUTTER AND CAMERA MODULE HAVING THE SAME

BACKGROUND

1. Field of the Invention

The present invention relates to the field of photography, and particularly to a electromagnetically driven mechanical shutter and a camera module having the same.

2. Description of the Related Art

Leaf or blade type mechanical shutters have frequently been used in cameras to regulate the amount of light reaching the image reception component of cameras. Typically, the leaf shutter consists of an array of metal "blades" pivoted with each other so as to pivot towards or away from the lens aperture of the camera. When the shutter is closed, the blades overlap the center of the lens aperture such that no light reaches the image reception component. When the shutter is open, the blades pivot away from the center of the aperture, so that light may pass through the aperture to the image reception component.

Conventional mechanical shutters utilize a motor, a drive shaft, a spring, and other components to rotate the shutter blades in the desired orientation to the lens aperture. Thus, the conventional mechanical shutters systems are usually very complex, presenting difficulty to size reduction.

What is needed, therefore, is a mechanical shutter with a relatively simple structure.

SUMMARY

In accordance with an embodiment, a mechanical shutter includes a base, four shutter blades, four permanent magnets, and four electromagnets. The base has an aperture permitting light into the camera module. The shutter blade includes a light shielding portion capable of moving across the aperture by rotating about a shaft formed on the base, a securing portion secured on the base, and an elastic portion connecting the light shielding portion and the securing portion. The permanent magnet is secured on a light shielding portion and sleeves around a shaft. The electromagnets provide magnetic force to rotate the permanent magnets

BRIEF DESCRIPTION OF THE DRAWINGS

Many aspects of the present mechanical shutter and camera module can be better understood with reference to the following drawings. The components in the drawings are not necessarily drawn to scale, the emphasis instead being placed upon clearly illustrating the principles of the present mechanical shutter and camera module.

DETAILED DESCRIPTION OF EMBODIMENTS

Embodiments will now be described in detail, with reference to the drawings.

Figure 1:
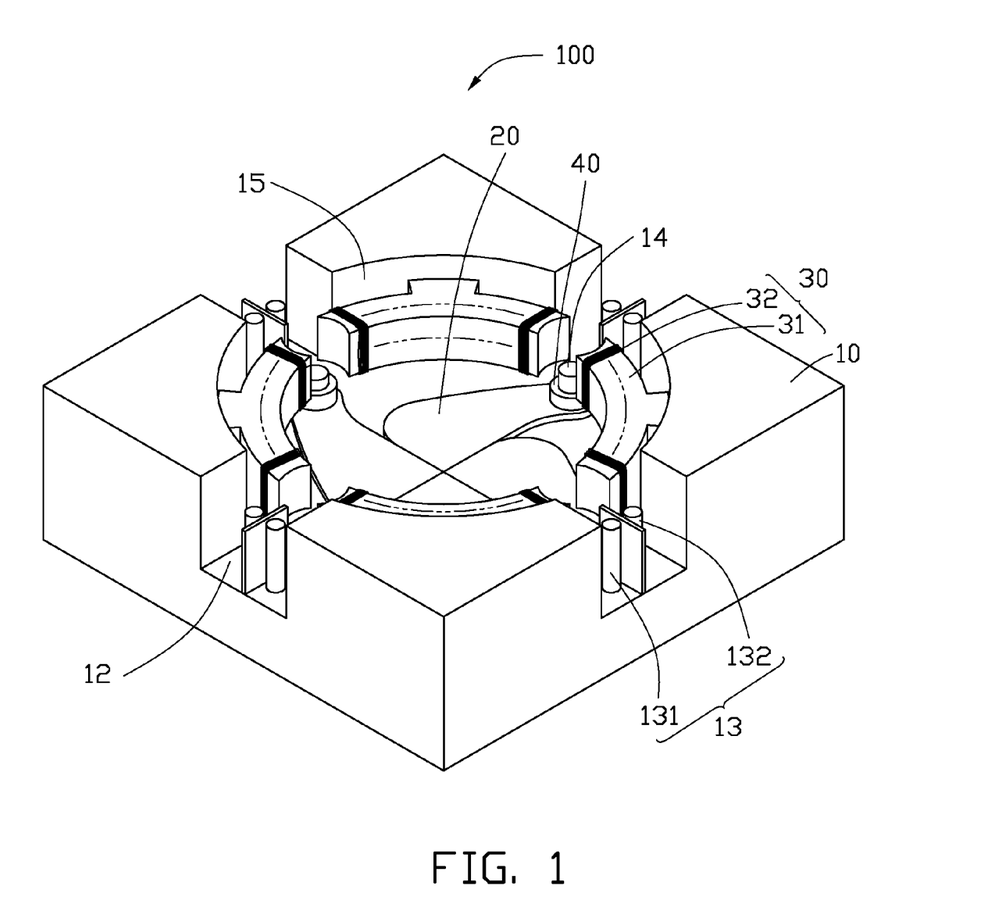
FIG. 1 is an isometric, schematic view of a mechanical shutter according to a first embodiment.
Figure 2:
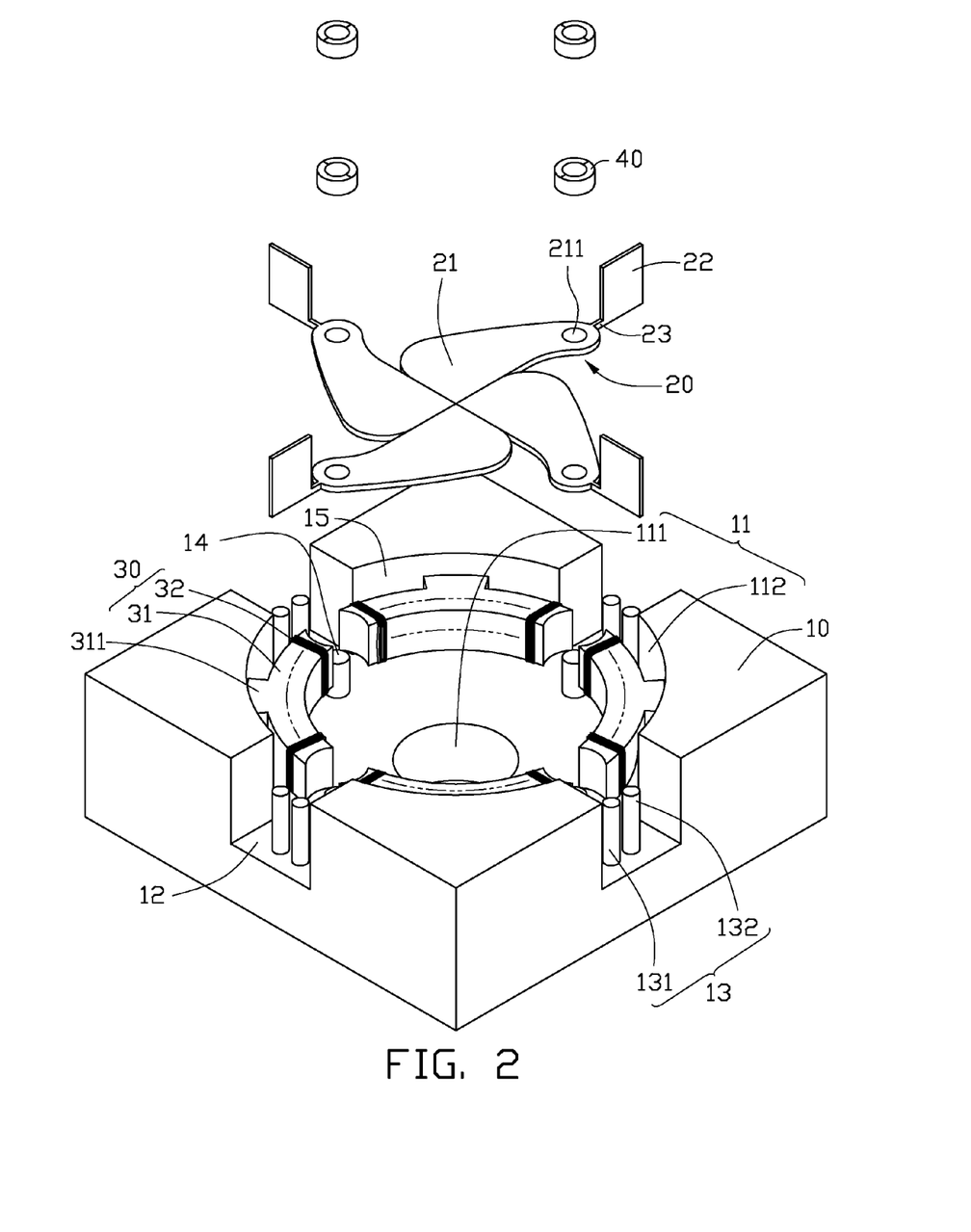
FIG. 2 is an exploded view of FIG. 1.

Referring to FIG. 1 and FIG. 2, a mechanical shutter 100 according to a first embodiment includes a base 10, four shutter blades 20, four electromagnets 30, and four permanent magnets 40.

The base 10 defines a stepped hole 11 including a receiving space 111 and an aperture 112 coaxial with the receiving space 111. The aperture 112 is configured for permitting light into a camera module (not shown). A sidewall 15 enclosing the receiving space 111 defines four gaps 12 dividing the sidewall 15 into four parts. The base 10 also has four fixing structures 13 and four shafts 14. Each of the fixing structures 13 is disposed in a gap 12, and includes two fixing posts 131 and 132. Each shaft 14 is arranged between the corresponding fixing structure 13 and the aperture 112.

Each electromagnet 30 is secured on the corresponding part of the sidewall 15. The electromagnet 30 includes a core 31 and a coil 32 circling the core 31. The core 31 is arcuate, and has a protruding portion 311 fixed to the sidewall 15. The electromagnets 30 and the shafts 14 are alternately arranged in a circle coaxial with the aperture 112.

Each shutter blade 20 includes a light shielding portion 21, a securing portion 22, and an elastic portion 23 connecting the light shielding portion 21 and the securing portion 22.

The light shielding portion 21 defines a through hole 211 near the elastic portion 23. The light shielding portion 21, at the through hole 211 thereof, is pivoted on the corresponding shaft 14, such that, the light shielding portion 21 can rotate about the shaft 14 to close and open the aperture 112. Preferably, the light shielding portion 21 is black and opaque.

In the present embodiment, the securing portion 22 is a flat plate perpendicular to the light shielding portion 21. The securing portion 22 is configured to be sandwiched between the fixing posts 131, 132. It is understood that the fixing structure 13 is not limited to the present embodiment, and that the securing portion 22 can define other shapes which can be secured to the fixing structures 13.

The shutter blades 20 can be copper or aluminum. To reduce assembly costs, the light shielding portion 21, the securing portion 22, and the elastic portion 23 can be integrally formed.

Each permanent magnet 40 is fixed on the light shielding portion 21 of the corresponding shutter blade 20 and sleeves around the shaft 14. In the present embodiment, the permanent magnet 40 is annular with a north pole and a south pole as shown in FIG. 3 and FIG. 4.

Figure 3:
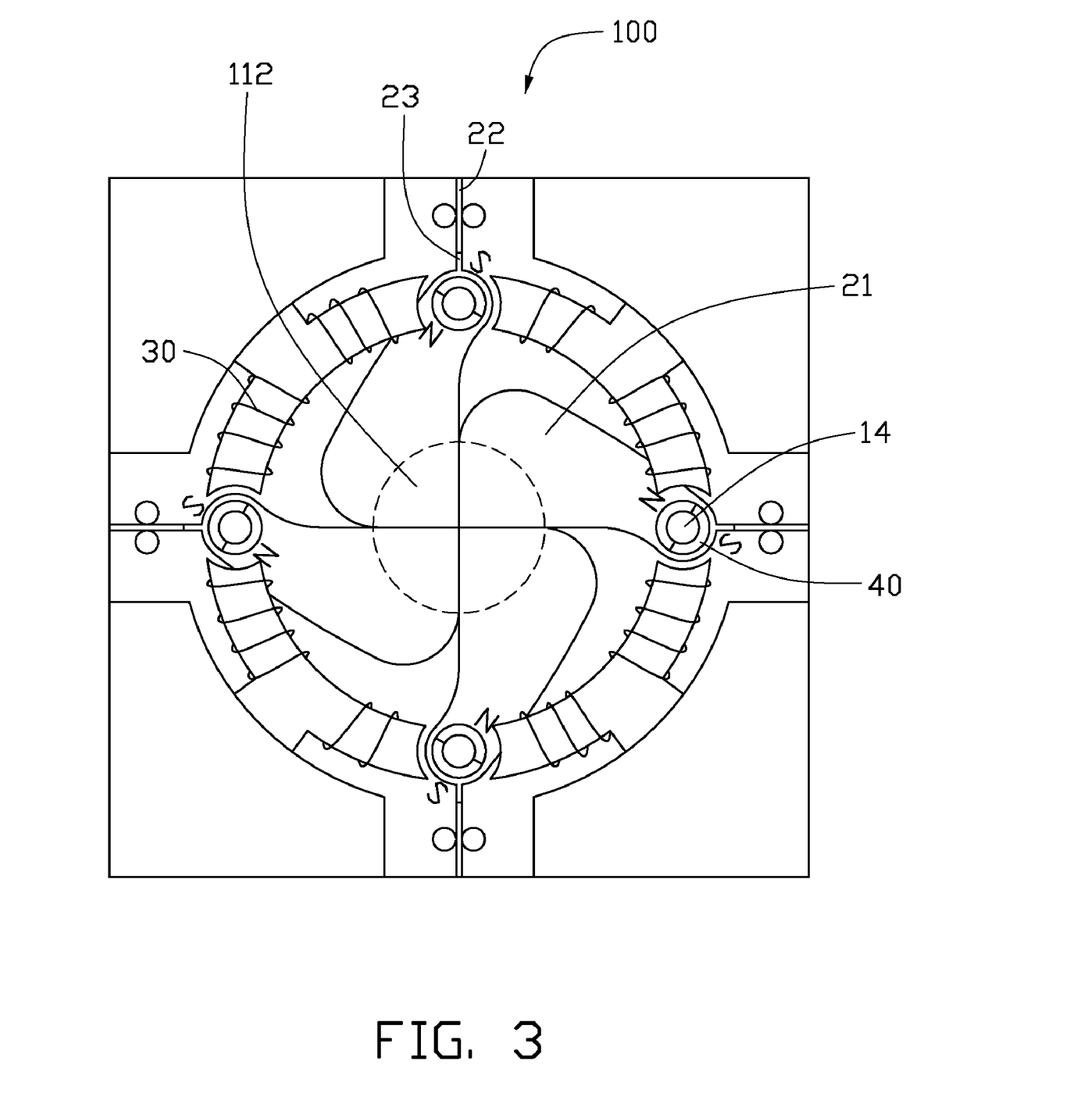
FIG. 3 and FIG. 4 illustrate operation of mechanical shutter of FIG. 1.
Figure 4:
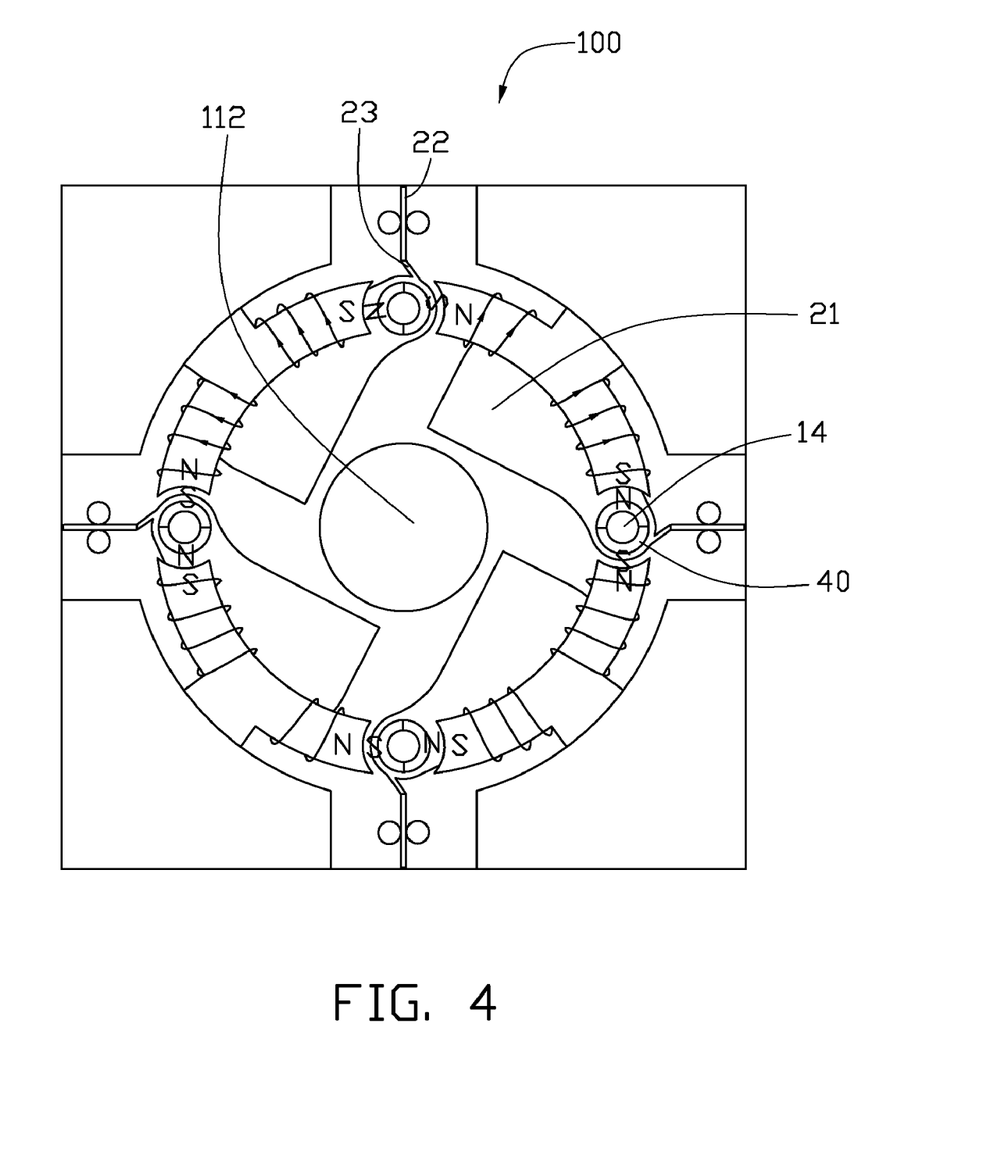

Referring to FIG. 3, the light shielding portions 21 of the shutter blades 20 are shown in a closed position completely covering the aperture 112 and not permitting any light to enter the optical path of the camera (not shown). In this condition, no current is supplied to the electromagnets 30. The permanent magnets 40 are in a first position. Referring to FIG. 4, when a current is supplied to the electromagnets 30, the electromagnets 30 generate a magnetic force to rotate the permanent magnets 40 to a second position. The light shielding portions 21 of each shutter blade 20 rotate with the corresponding permanent magnet 40, moving to an open position, permitting light to enter the optical path of the camera. Because the securing portion 22 of each shutter blade 20 is secured by the fixing structure 13, the elastic portion 23 of the shutter blade 20 is deformed when the light shielding portion 21 is rotated. When the current supplied to the electromagnets 30 is interrupted, the light shielding portion 21 of each shutter blade 20 returns to the closed position by elastic force of the elastic portion 23.

Figure 5:
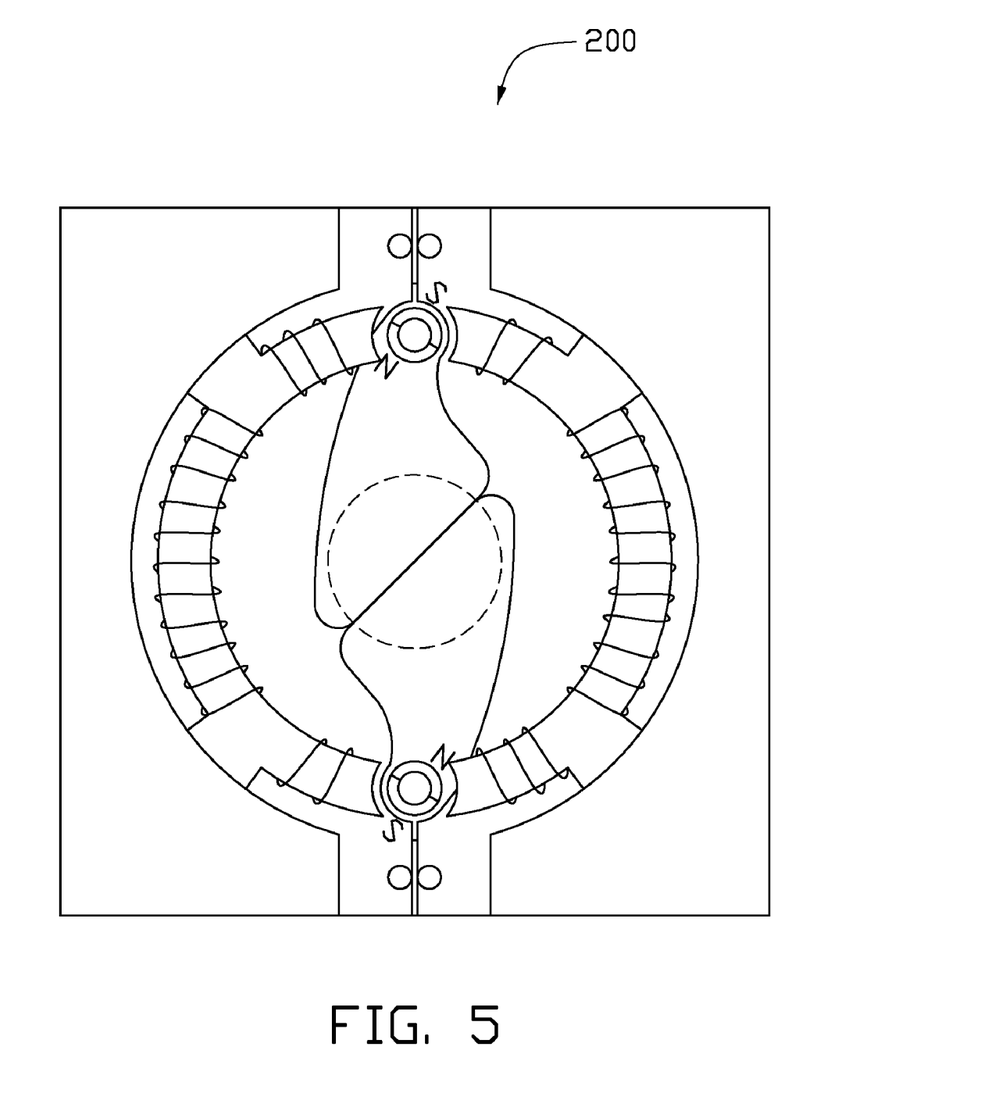
FIG. 5 is an isometric, schematic view of a mechanical shutter according to a second embodiment.

Referring to FIG. 5, a mechanical shutter 200 according to a second embodiment is similar to the mechanical shutter 100 of the first embodiment, differing only in that the mechanical shutter 200 has only two shutter blades.

Figure 6:
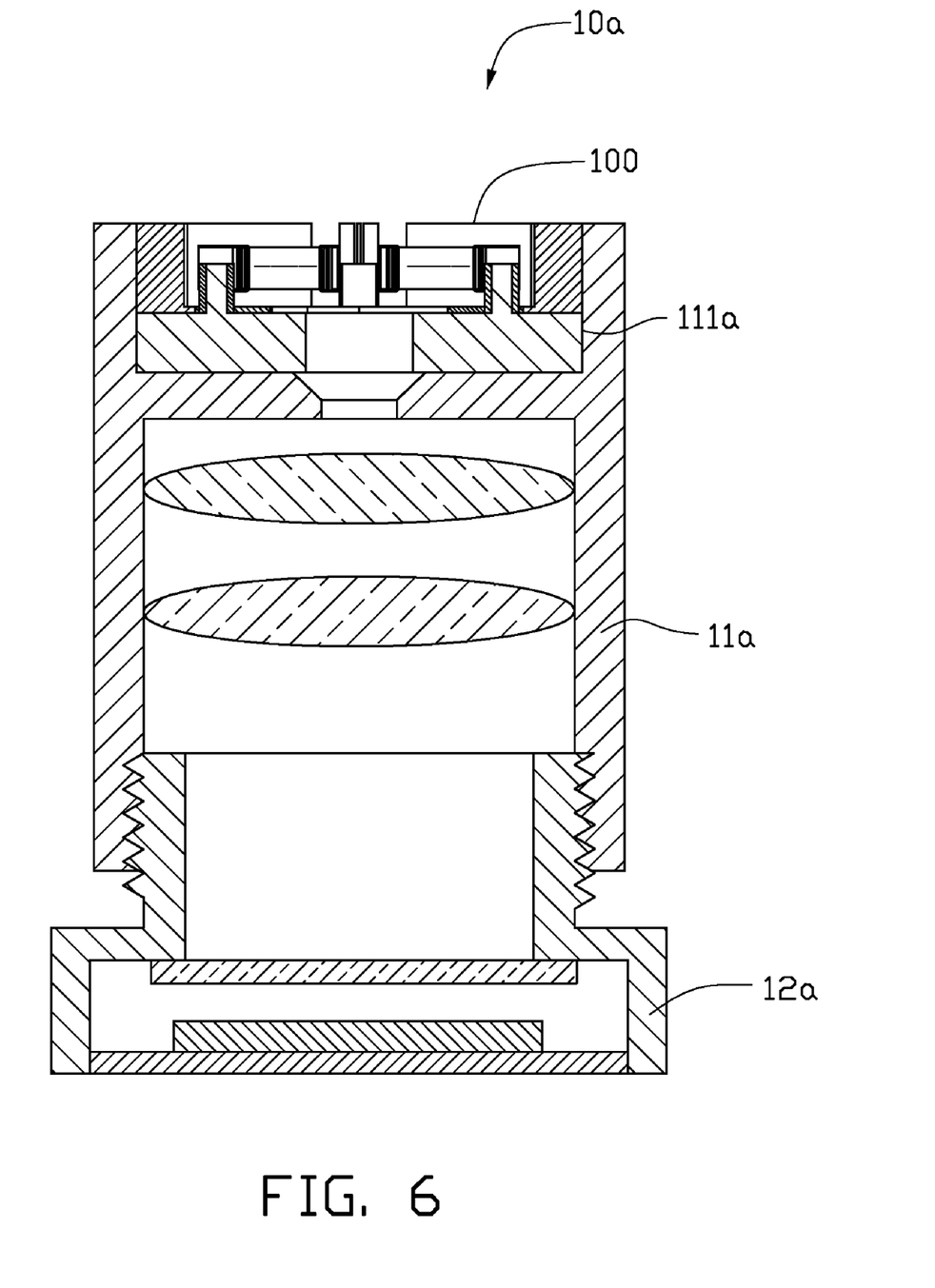
FIG. 6 is a cross-section of a first camera module using the mechanical shutter of FIG. 1.

Referring to FIG. 6, a camera module 10a includes a mechanical shutter 100, a barrel 11a, and a holder 12a. The barrel 11a includes a receiving space 111a at the top end thereof away from the holder 12a. The mechanical shutter 100 is received in the receiving space 111a and aligned with the barrel 12a.

Figure 7:
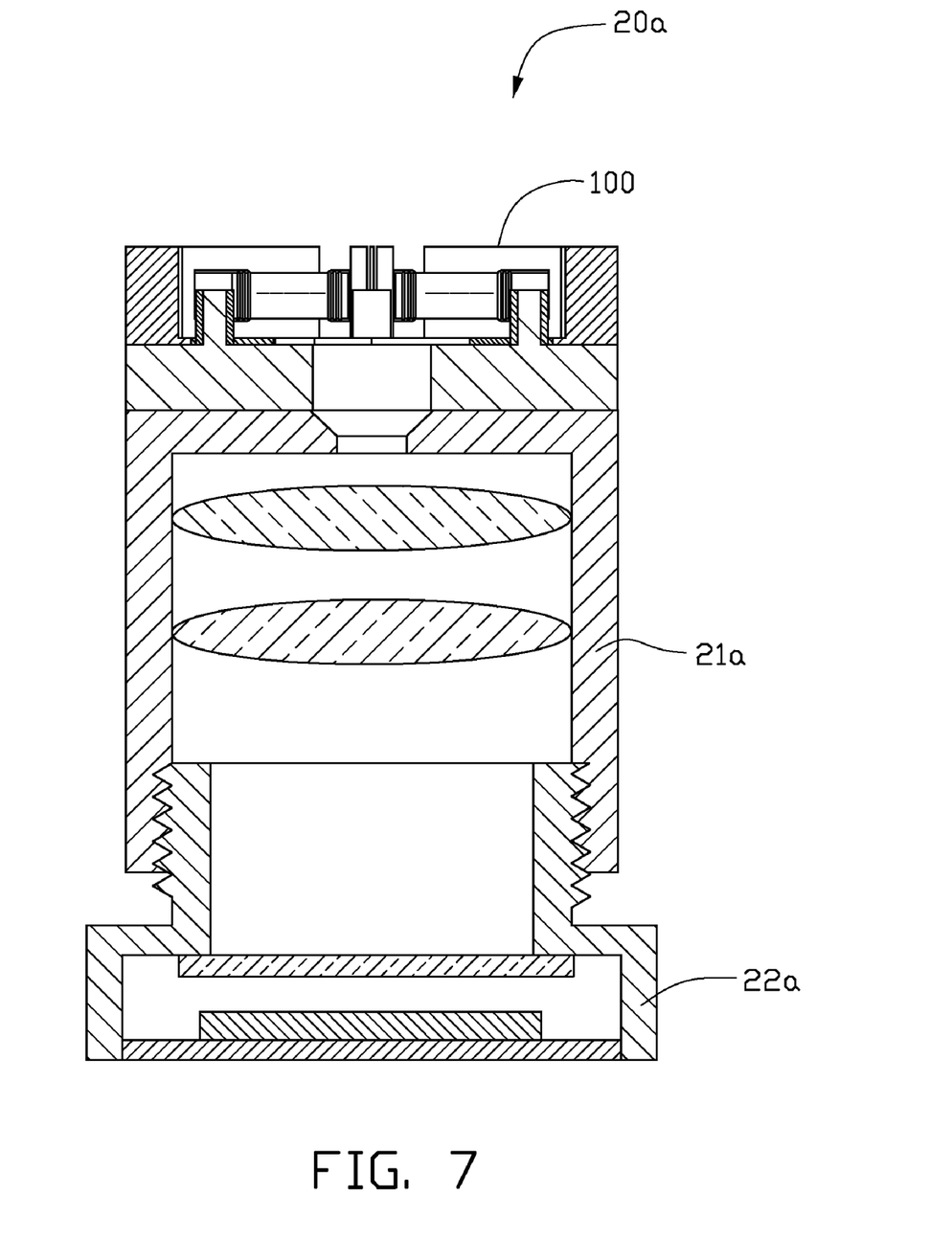
FIG. 7 is a cross-section of a second camera module using the mechanical shutter of FIG. 1.

Referring to FIG. 7, a camera module 20a is similar to the camera module 10a, differing only in that the mechanical shutter 100 of the camera module 20a is adhered to the top end of a barrel 21a of the camera module 20a away from a holder 22a.

Figure 8:
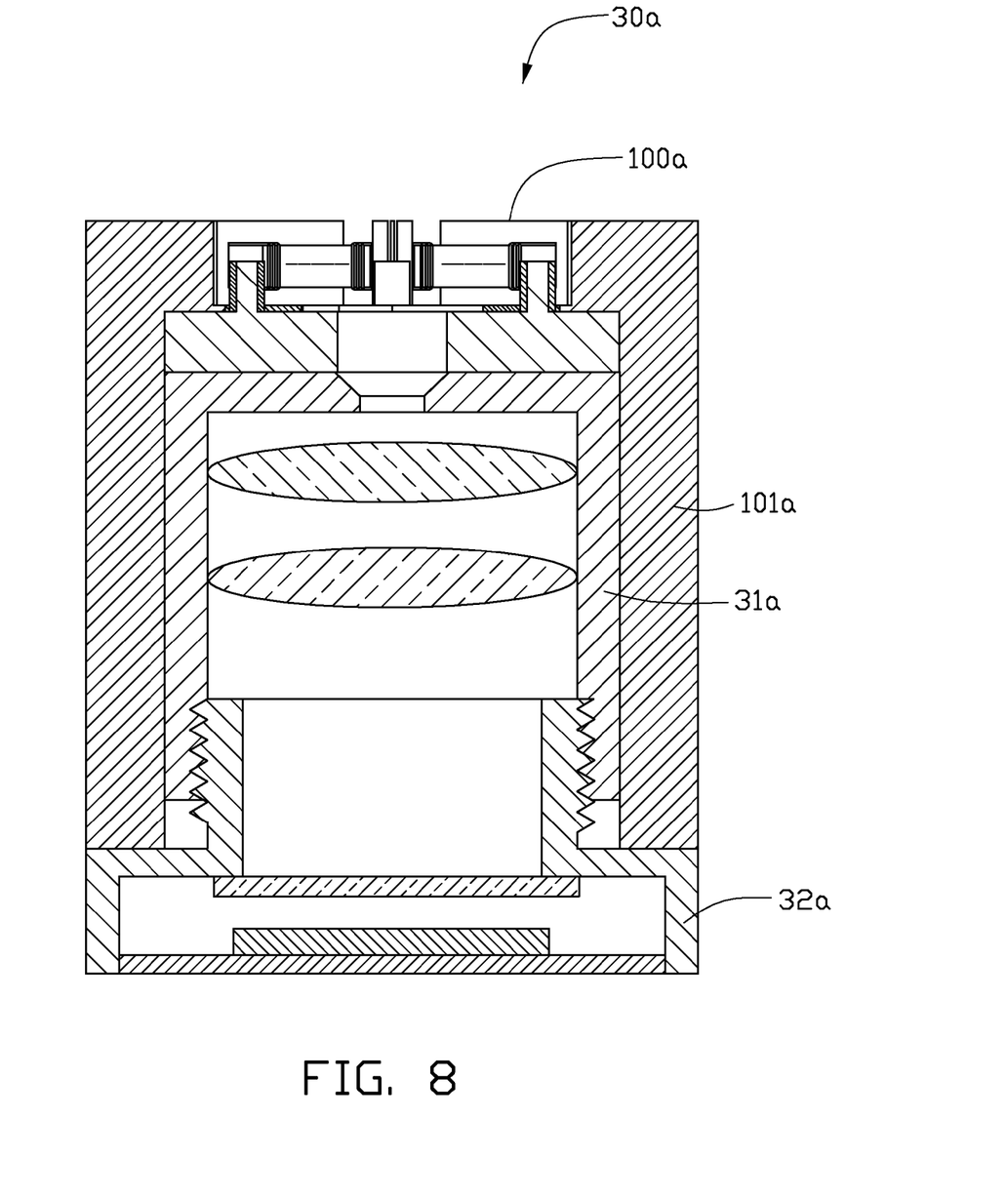
FIG. 8 is a cross-section of a third camera module.

Referring to FIG. 8, a camera module 30a is similar to the camera module 20a. The camera module 30a includes a mechanical shutter 100a, a barrel 31a, and a holder 32a, and differs only in that the mechanical shutter 100a includes a sleeve 101a secured to the holder 32a and cooperating with the holder 32a to enclose the barrel 31a therein.

The mechanical shutter of the embodiment uses magnetic force to drive shutter blades thereof, without the need for numerous components, such as drive shafts, springs, and so on. The structure of the mechanical shutter is relatively simple and amenable to size reduction.

While certain embodiments have been described and exemplified, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A mechanical shutter for a camera module, comprising:
    a base defining:
        an aperture for permitting light into the camera module,
        a receiving space coaxial to the aperture for receiving one or more electromagnets, and
        one or more gaps surrounding the receiving space;
    two fixing posts disposed in each of the one or more gaps;
    one or more shutter blades, each comprising:
        a light shielding portion capable of moving across the aperture by rotating about a shaft formed on the base,
        a securing portion secured on the base and sandwiched between the two fixing posts of one of the one or more gaps, and
        an elastic portion connecting the light shielding portion and the securing portion;
    one or more permanent magnets secured on the one or more light shielding portions and sleeved around the one or more shafts respectively; and
    one or more electromagnets capable of providing magnetic force to rotate the one or more permanent magnets.

2. The mechanical shutter as claimed in claim 1, wherein the one or more electromagnets are arcuate and secured to the base, and the one or more electromagnets and the one or more shafts are alternately arranged in a circle coaxial with the aperture.

3. The mechanical shutter as claimed in claim 1, wherein the one or more permanent magnets are annular.

4. The mechanical shutter as claimed in claim 1, wherein the one or more shutter blades are copper or aluminum.

5. The mechanical shutter as claimed in claim 1, wherein the light shielding portion, the securing portion, and the elastic portion of the shutter blade are integrally formed.

6. The mechanical shutter as claimed in claim 1, wherein the light shielding portion is black.

7. The mechanical shutter as claimed in claim 1, wherein the securing portion is configured to be a flat plate perpendicular to the light shielding portion.

8. A camera module comprising a barrel, a holder, and a mechanical shutter, the mechanical shutter comprising:
    a base defining:
        an aperture aligned with the barrel, for permitting light into the camera module,
        a receiving space coaxial to the aperture for receiving one or more electromagnets, and
        one or more gaps surrounding the receiving space;
    two fixing posts disposed in each of the one or more gaps;
    one or more shutter blades, each shutter blade comprising:
        a light shielding portion capable of moving across the aperture by rotating about a shaft formed on the base,
        a securing portion configured to be a flat plate, secured on the base and inserted between the two fixing posts of one of the one or more gaps, and
        an elastic portion connecting the light shielding portion and the securing portion;
    one or more permanent magnets secured on the one or more light shielding portions and sleeved around the one or more shafts respectively; and
    one or more electromagnets capable of providing magnetic force to rotate the one or more permanent magnets.

9. The camera module as claimed in claim 8, wherein the barrel comprises a receiving space at the top end thereof away from the holder, and the mechanical shutter is received in the receiving space and aligned with the barrel.

10. The camera module as claimed in claim 8, wherein the mechanical shutter is adhered to a top end of a barrel away from a holder.

11. The camera module as claimed in claim 8, wherein the mechanical shutter further comprises a sleeve secured to the holder and cooperating with the holder to enclose the barrel therein.

12. The camera module as claimed in claim 8, wherein the mechanical shutter further comprises a plurality of arcuate electromagnets arranged in a circle coaxial to the aperture, and the arcuate electromagnets are separated from each other with a shaft of the one or more shafts of the base disposed between each two adjacent arcuate electromagnets.

13. The camera module as claimed in claim 8, wherein the one or more permanent magnets are annular.

14. The camera module as claimed in claim 8, wherein the light shielding portion, the securing portion, and the elastic portion of the shutter blade are integrally formed.

15. The camera module as claimed in claim 8, wherein the light shielding portion is black.

16. The camera module as claimed in claim 8, wherein the securing portion is perpendicular to the light shielding portion.

17. A mechanical shutter for a camera module, comprising:
    a base defining an aperture for permitting light into the camera module;
    one or more pairs of fixing posts disposed on the base and surrounding the aperture;
    one or more shutter blades, each comprising:
        a light shielding portion capable of moving across the aperture by rotating about a shaft formed on the base,
        a securing portion configured to be a flat plate perpendicular to the light shielding portion, and sandwiched between one corresponding pair of fixing posts and secured on the base, and
        an elastic portion connecting the light shielding portion and the securing portion;

one or more permanent magnets secured on the one or more light shielding portions and sleeved around the one or more shafts respectively; and one or more electromagnets capable of providing magnetic force to rotate the one or more permanent magnets.

18. The mechanical shutter as claimed in claim 17, wherein the base further defines one or more gaps surrounding the aperture, and the one or more pairs of fixing posts are disposed in the one or more gaps, respectively.

19. The mechanical shutter as claimed in claim 17, wherein the one or more electromagnets are secured to the base, and the one or more electromagnets and the one or more shafts are alternately arranged in a circle coaxial with the aperture.

* * * * *